(12) United States Patent
Glatz

(10) Patent No.: US 7,398,790 B2
(45) Date of Patent: Jul. 15, 2008

(54) EXTENSION ARM FOR A FREE ARM PARASOL, PIVOTABLY ARRANGED ON A CARRIER

(75) Inventor: Gustav Adolf Glatz, Frauenfeld (CH)

(73) Assignee: Glatz AG, Frauenfeld (CH)

( * ) Notice: Subject to any disclaimer, the term of this patent is extended or adjusted under 35 U.S.C. 154(b) by 169 days.

(21) Appl. No.: 10/568,936

(22) PCT Filed: Jul. 9, 2004

(86) PCT No.: PCT/CH2004/000436

§ 371 (c)(1),
(2), (4) Date: Feb. 21, 2006

(87) PCT Pub. No.: WO2005/018369

PCT Pub. Date: Mar. 3, 2005

(65) Prior Publication Data

US 2006/0243311 A1    Nov. 2, 2006

(30) Foreign Application Priority Data

Aug. 22, 2003    (CH) .................................... 1431/03

(51) Int. Cl.
*A47F 5/00*      (2006.01)
*A47F 7/00*      (2006.01)
*F16M 11/00*    (2006.01)
*F16M 13/00*    (2006.01)
*A45B 11/00*    (2006.01)
*A45B 17/00*    (2006.01)
*A45B 23/00*    (2006.01)
*A45B 25/00*    (2006.01)

(52) U.S. Cl. .................... 135/20.1; 135/20.3; 248/122.1

(58) Field of Classification Search .............. 135/120.2, 135/20.1, 20.3, 21, 90, 98; 248/121, 122.1, 248/291.1, 292.14; 59/95; 403/105

See application file for complete search history.

(56) References Cited

U.S. PATENT DOCUMENTS

| | | | | | |
|---|---|---|---|---|---|
| 5,116,258 | A | * | 5/1992 | Vennik ...................... | 135/20.3 |
| 6,588,438 | B1 | * | 7/2003 | Steiner ...................... | 135/20.1 |
| 6,662,815 | B2 | * | 12/2003 | Tung ......................... | 135/20.1 |
| 2003/0010366 | A1 | * | 1/2003 | Glatz ......................... | 135/21 |

FOREIGN PATENT DOCUMENTS

| EP | 0 050 079 A1 | 4/1982 |
|---|---|---|
| EP | 0 741 531 B1 | 11/1996 |
| EP | 0 830 074 B1 | 3/1998 |
| EP | 0 877 174 A1 | 11/1998 |
| WO | WO 01/52686 A1 | 7/2001 |

* cited by examiner

*Primary Examiner*—David R Dunn
*Assistant Examiner*—Kaitlin A Wilson
(74) *Attorney, Agent, or Firm*—George Pappas

(57) ABSTRACT

The invention relates to an extension arm (6) that is arranged on a carrier (4) in such a way that it can pivot about the axis (18) thereof by means of a steering rod (20), and can be blocked in the pivoted position. Said steering rod (20) is arranged on a sleeve (44) that can be pivoted about the extension arm (6), can engage with the extension arm in different rotational angle positions, and can be directly or indirectly blocked on the carrier. According to the invention, a first coupling part (40) fixed to the extension arm (6) co-operates with a second coupling part (42) arranged on the sleeve (44) and acting in the axial direction. Furthermore, the steering rod (20) comprises a supporting element (56) that co-operates with a counterpart (58) arranged on the extension arm (6), in order to displace the second coupling part (42) in the axial direction by means of the steering rod (20). In this way, the extension arm can be pivoted and blocked in a simple manner with one hand.

20 Claims, 4 Drawing Sheets

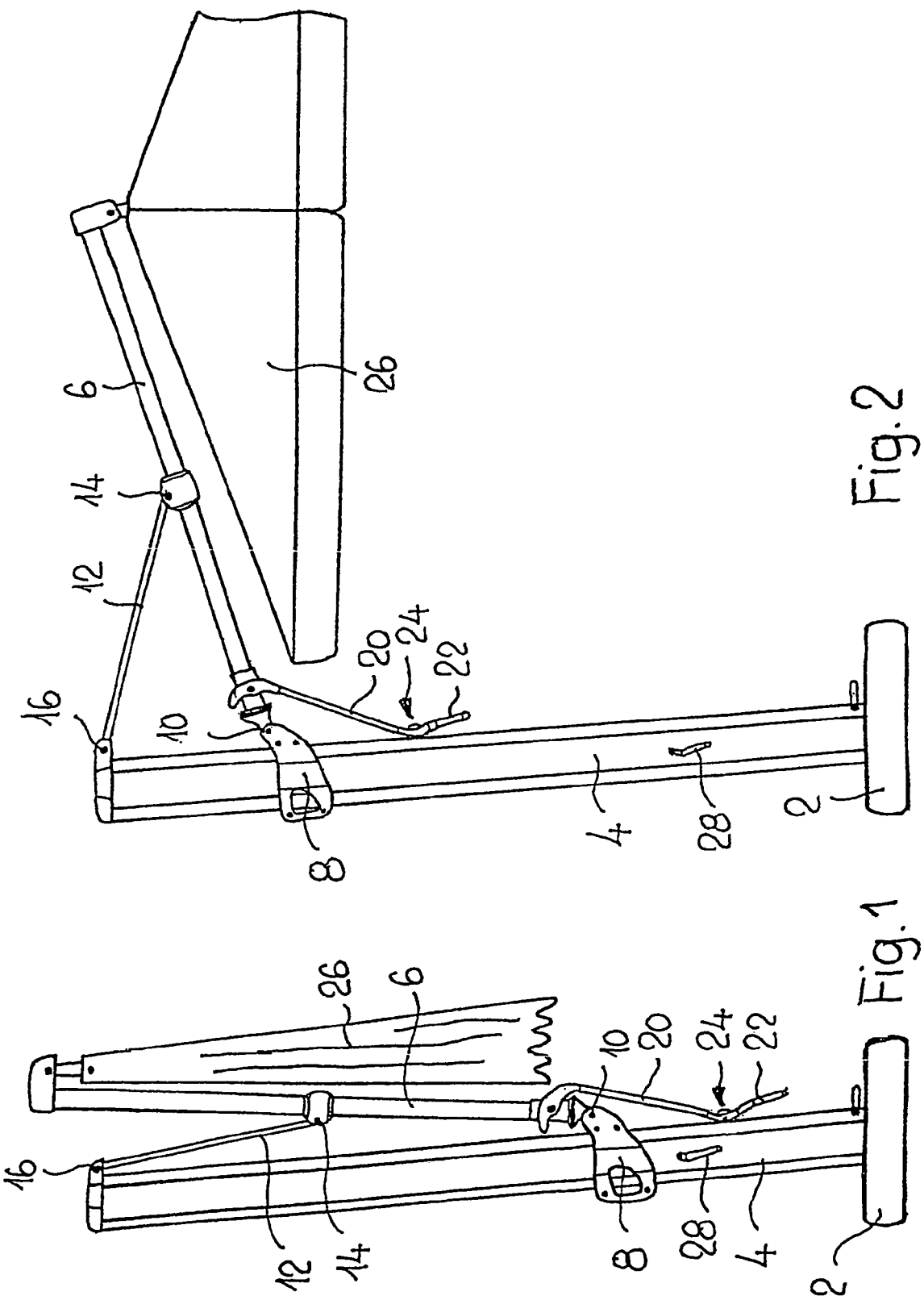

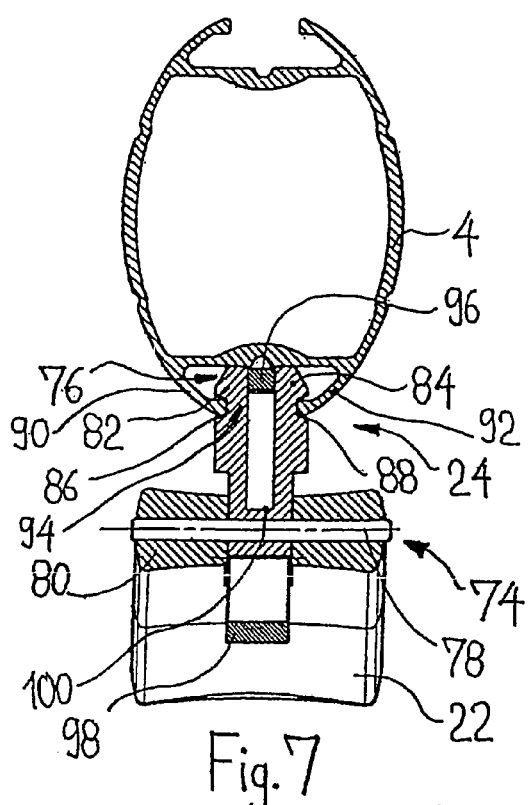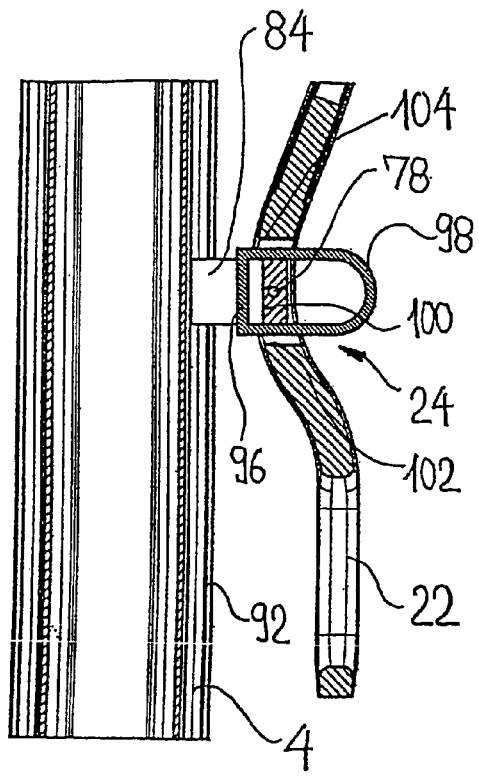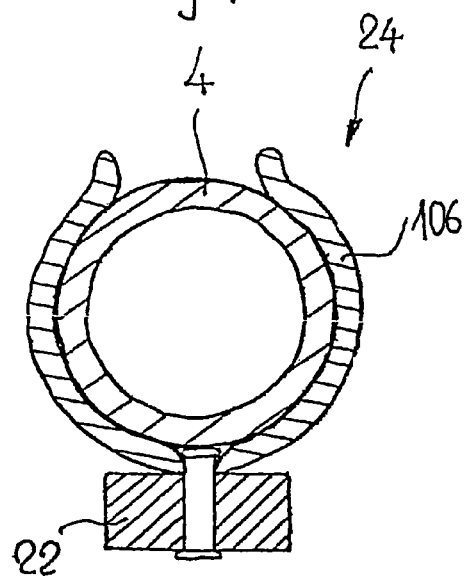

EXTENSION ARM FOR A FREE ARM PARASOL, PIVOTABLY ARRANGED ON A CARRIER

This application claims priority of PCT application PCT/CH2004/000436 having a priority date of Aug. 22, 2003, the disclosure of which is hereby incorporated herein by reference.

FIELD OF THE INVENTION

The invention relates to an extension arm for a free arm parasol, pivotably arranged about its axis on a carrier.

BACKGROUND OF THE INVENTION

An extension arm of the type mentioned at the beginning, pivotably arranged about its axis on a carrier, is known, for example, from WO 01/52686, in which the extension arm is configured as an extendable free arm and the carrier is configured as a pole of a free arm parasol. For optimum use of shade as the position of the sun changes, not only can the pole be rotated about its own axis, but, in particular, the extension arm can also be pivoted about its axis, so that the parasol can be brought into a corresponding oblique position and can be retained there. For this purpose, a guide rod is attached in an articulated manner to a sleeve which is arranged in a manner such that it can pivot about the extension arm and can be latched in various pivoted positions on the extension arm by means of a latching device. For the latching, use is made of a latching bolt which is mounted in a radially displaceable manner in the sleeve, is preloaded against the extension arm by means of a spring and can be latched into various openings in the extension arm. In order to release the latching bolt, a pulling member is arranged in the guide rod and is connected to the latching bolt and can be actuated on a hand part of the guide rod by means of a handle. It is disadvantageous here that, firstly, the possible number of pivoted angles of the guide rod on the extension arm is limited. Secondly, during the actuation of the hand lever to unlatch the latching bolt by pulling radially on the handle and to pivot the guide rod, two maneuvers are always required. When the latching device is released, the guide rod can be pivoted around the extension arm, whereupon the changed angular position on the extension arm can be retained by actuation of the latching device. By the latched guide rod being pivoted back toward the carrier and being retained on the carrier, the extension arm is secured in the pivoted position.

SUMMARY OF THE INVENTION

It is the object of the invention to configure an extension arm for a free arm parasol, arranged pivotably about its axis on a carrier, in such a manner that the pivoting and retaining of the extension arm are possible via a single operating element by means of simplified movements with one hand.

Owing to the fact that a first coupling part, which is connected fixedly to the extension arm, interacts with a second coupling part, which is formed on the sleeve and is effective in the axial direction, the guide rod having a supporting element which interacts with a counterpart arranged on the extension arm, the second coupling part can be displaced in the axial direction by means of the guide rod and, in the process, can initiate the coupling and decoupling without additional members having to be actuated. By means of the guide rod, in the decoupled state the sleeve can be pivoted freely about the extension arm and, in the coupled state, the extension arm can be pivoted by means of the same guide rod.

Advantageous configurations of the extension arm are described hereinbelow.

A particularly simple configuration of the guide rod has a fork-like supporting element and is coupled with the latter to the second coupling part via two bearing bolts.

The coupling may be configured in a different manner. In one embodiment, the coupling is designed as a toothed coupling. In the simplest case, at least one tooth element can be arranged in one coupling part and two recesses can be arranged in the associated coupling part. Preferably, however, the two have a relatively large number of teeth which can intermesh. The larger the tooth pitch, the finer is the adjustable angle of inclination of the extension arm. The toothed coupling also forms a positive coupling which prevents an unintentional pivoting of the extension arm. A particularly fine adjustment of the rotational angle of the extension arm is permitted by an embodiment in which the coupling is configured as a friction coupling. The non-positive friction coupling requires a sufficient preloading of the coupling parts in relation to each other in order to prevent an unintentional adjustment of the rotational angle of the extension arm. The first coupling part can be connected directly or indirectly to the extension arm.

In order to avoid injuries, it is expedient if one of the coupling parts has a sleeve part surrounding the coupling region and/or spring region, so that an unintentional intervention of an operator in the coupling region and/or spring region is prevented.

According to one embodiment, the extension arm is arranged in a manner such that it can rotate about its axis on a carrying element, and the carrying element, for its part, is connected via a joint to a slide which can be moved and retained along the carrier. In this case, the joint is preferably configured as a pin joint which prevents the extension arm from pivoting about the carrier.

Various possibilities likewise emerge for the design of the supporting element. In alternative embodiments, the supporting element can be arranged on an upper arm of the guide rod and can have a stop lug or can be designed as a one- or two-sided eccentric. The stop lug, or the one- or two-sided eccentric, is connected in a sliding manner to the counterpart on the extension arm, the second coupling part being preloaded toward the first coupling part by means of a preloading spring. The preloading spring is preferably arranged in the interior of the sleeve-like, second coupling part and is supported at one end on the coupling part and at the other end on the extension arm. The arrangement of the preloading spring in the sleeve-like, second coupling part prevents accidents.

In a further configuration of the supporting element, a joint is arranged on an upper arm of the guide rod and is connected to a counterpart which is arranged in a manner such that it can pivot about the extension-arm axis. In the case of this positive connection, a preloading spring can be omitted, since the coupling and uncoupling of the coupling parts is made possible by actuation of the guide rod in both directions.

In another embodiment, the guide rod has a retaining device on its lower section, by means of which the guide rod can be retained on the carrier. The retaining element can be configured as a resilient retaining clip. In this case, it is advantageous if the retaining clip is connected to the guide rod in an articulated manner in order to be able to adapt to changes in position during the displacement along the carrier. It is particularly advantageous if the retaining element, is configured as a retaining lug which engages in a longitudinal slot arranged on the pole. In this case, it is advantageous if the retaining lug comprises two lug parts which are arranged at a distance from each other and engage on side parts of the longitudinal slots in a retaining manner. To this end, it is advantageous if the lug parts are resilient. It is particularly advantageous if the lug parts are secured against becoming unlatched from the longitudinal slot by means of a blocking slider. In this case, the arrangement can nevertheless be undertaken in such a manner that a movement of the supporting element along the carrier is possible even when the retaining clip is latched.

It is particularly advantageous if the extension arm is configured as an extendable free arm and the carrier is configured as a pole of a free arm parasol, as described in EP-0 741 531, 0830 074 and WO 01/52686.

BRIEF DESCRIPTION OF THE DRAWINGS

Exemplary embodiments of the invention are described in more detail below with reference to the drawings, in which:

FIG. 1 shows the free arm parasol in a closed position;

FIG. 2 shows the free arm parasol in an opened position;

FIG. 7 shows a retaining element, which is latched to the pole, with retaining lugs, in horizontal section;

FIG. 8 shows the retaining element, which is latched to the pole, from FIG. 7, in vertical section;

FIG. 9 shows a, which is latched to the pole, with a retaining clip engaging around the pole, in cross section.

DETAILED DESCRIPTION OF THE INVENTION

Figures 3, 4:
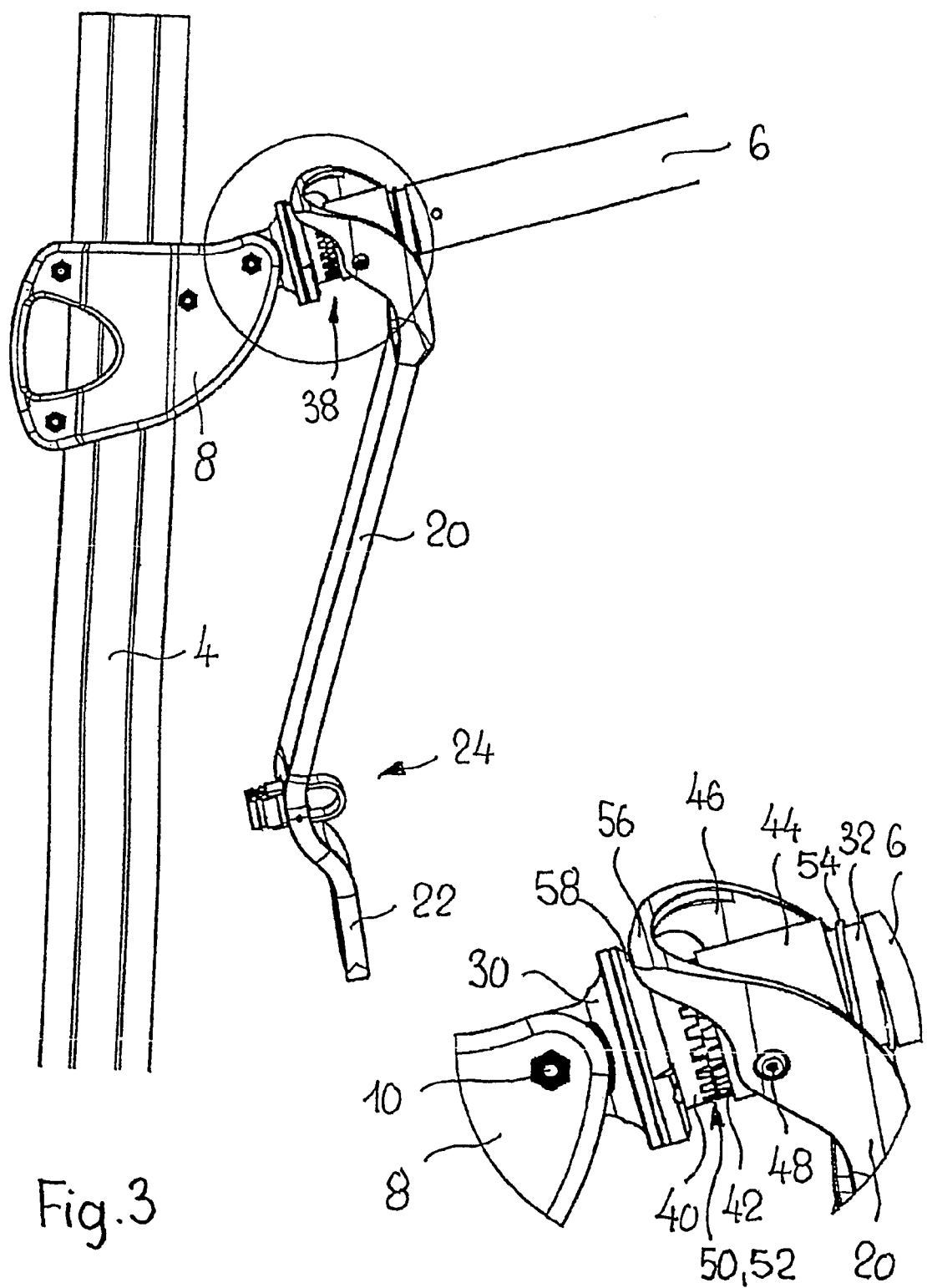
FIG. 3 shows the guide-rod arrangement of the free arm parasol of FIG. 2 in an excerpt and on an enlarged scale.
FIG. 4 shows the guide-rod arrangement of FIG. 3 in an excerpt and on an enlarged scale.

Apart from the particular configuration of the extension arm's pivoting capability, the free arm parasol illustrated in FIGS. 1 to 5 can be configured in accordance with WO 01/52686.

The free arm parasol illustrated in FIGS. 1 to 5 has a pole 4 which is secured, for example, in a base 2 and serves as a carrier for an extendable extension arm 6. The latter is arranged via a joint 10 on a slide 8 which is movable along the pole. The extension arm 6 is supported on the upper end of the pole via a connecting rod 12. For this purpose, the connecting rod 12 is connected, on the one hand, to the extension arm 6 via a joint 14 between the two ends of the extension arm, and, on the other hand, is connected to the upper end of the pole via a further joint 16. The pivoting of the extension arm 6 about its axis 18 is carried out with the aid of a guide rod 20. The latter has, on its lower region, a handle 22 and a retaining device 24, the latter serving to retain the guide rod 20 on the pole 4 and therefore to hold the extension arm 6 in the selected pivoted position.

Arranged at the end of the extension arm is a canopy 26 which is closed when the extension arm is retracted, as shown in FIG. 1, and can be opened when the extension arm is extended, as is revealed in FIG. 2. The movement of the slide 8 along the pole 4 in order to open and close the canopy takes place by operation of a crank 28. There are likewise different possibilities for opening and closing the canopy, preferred ones of which can be taken from EP-0 741 531 or 0 830 074.

Figure 5:
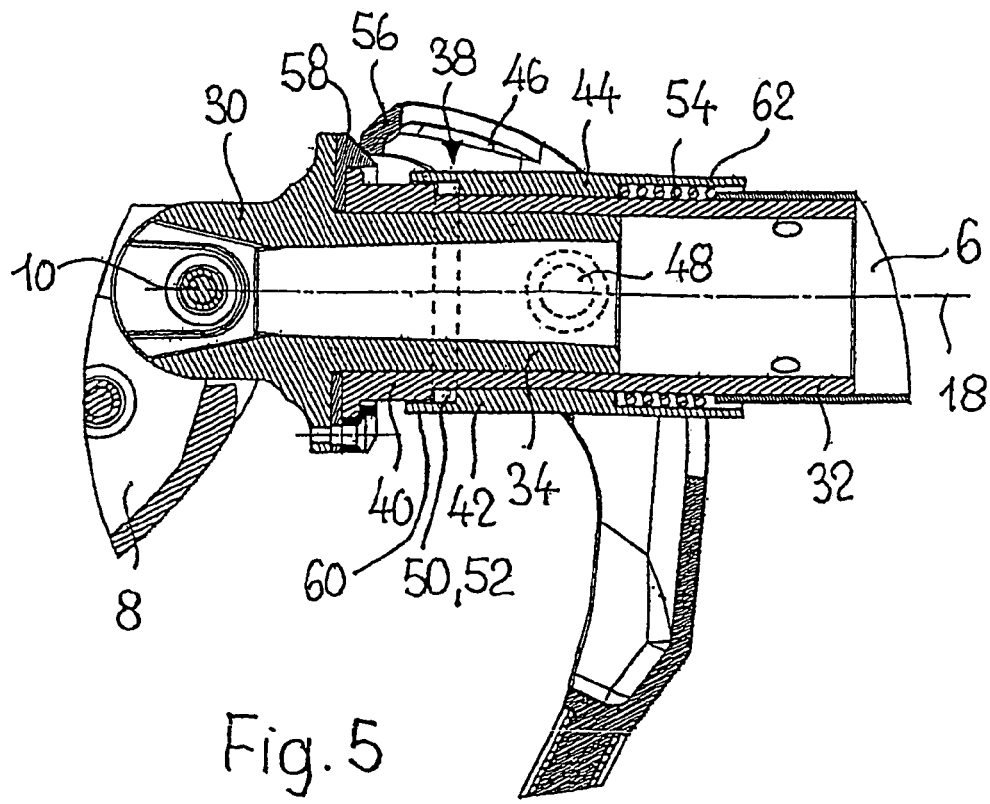
FIG. 5 shows the guide-rod arrangement of FIG. 4 in longitudinal section and on an enlarged scale.

Details with regard to the arrangement of the extension arm 6 on the pole 4 and with regard to the pivoting of the extension arm about its axis 18 and the components used for this emerge in particular from FIGS. 3 to 5.

The extension arm 6 is arranged in a manner such that it can pivot about its axis 18 on a carrying element 30 which, for its part, is connected to the slide 8 via the joint 10, which is designed as a pin joint. The tubular extension arm 6 is provided with a sliding sleeve 32 which is arranged rotatably on a connecting piece 34 of the supporting element 30. The sliding sleeve 32 is connected to the guide rod 20 via a coupling 38. For this purpose, the sliding sleeve 32 has a first coupling part 40 which interacts with a second coupling part 42 arranged on a coupling sleeve 44 which is mounted rotatably on the sliding sleeve 32. The guide rod 20 is fastened pivotably with a fork-shaped part 46 to the coupling sleeve by means of bearing bolts 48. The first coupling part 40 has a toothing 50 which interacts with the toothing 50 of the second coupling part 42. A preloading spring 54 lies within the coupling sleeve and is supported, on the one hand, on the coupling sleeve, and, on the other hand, on the tubular extension arm 6 and preloads the second coupling part 42 towards the first coupling part 40. As a result, the guide rod 20 is connected in a rotationally fixed manner to the extension arm 6, so that the extension arm 6 joins in with pivoting movements of the guide rod 20. The retaining of the position of the extension arm 6 with regard to its pivoted position takes place via the guide rod 20 which is retained on the pole 4 by means of the retaining device 24. In order to release the coupling 38, the guide rod 20 has, at the upper end, a supporting element 56 which is designed in the form of a curve which connects the fork-like part 46 of the guide rod. After the release of the retaining device 24 and the pivoting-out of the guide rod 20 about the bearing bolts 48, the supporting element 56 is supported on a sliding ring 58, so that, as the pivoting-out of the guide rod 20 progresses, the second coupling part 42 can be brought out of engagement with the first coupling part 40 counter to the preloading force of the preloading spring 54. In the decoupled state, the guide rod 20 can be pivoted by means of the coupling sleeve 44 about the extension arm by an angle by which the extension arm and therefore the parasol is to be pivoted about the axis 18. In the desired position, by the guide rod 20 being pivoted back toward the pole 4, the second coupling part 42 is again brought into engagement with the first coupling part 40, so that the extension arm 6 can be pivoted about the connecting piece 34 of the carrying element 30 by means of the guide rod 20. In order to retain the desired pivoted position, the guide rod 20 is connected again to the pole 4 via the retaining device 24, so that the pivoted position of the extension arm and therefore of the parasol is secured.

In order to prevent accidents, the coupling sleeve is provided with a first skirt 60 which engages over the toothing 50, 52. A second skirt 62 covers the preloading spring 54.

Figure 6:
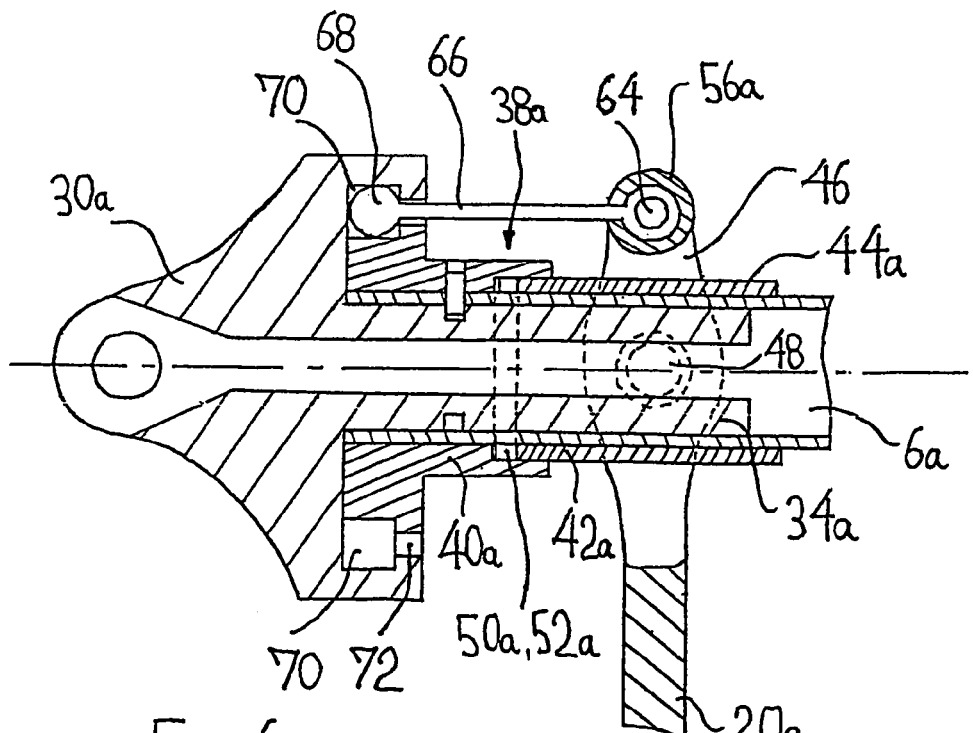
FIG. 6 shows a further exemplary embodiment of the support of the extension arm on the pole, in longitudinal section.

FIG. 6 describes a further variant embodiment of the carrying element 30a and its connection to the guide rod 20a. The extension arm 6a is in turn connected rotatably to a connecting piece 34a of the carrying element 30a and has a first coupling part 40a, and the latter is connected to a second coupling part 42a which is arranged on a coupling sleeve 44a which can be pivoted about the extension arm 6a. The guide rod 20a is in turn rotatably fastened to this coupling sleeve. The guide rod 20a is provided at the upper end with a supporting element 56a which is connected via a joint 64 to a counterpart 66. The latter is designed as a coupling element which can be moved in an encircling groove 70 and an access slot 72 via a ball head 68 in order to follow the pivoting movement of the guide rod 20a. By means of the fixed, articulated connection between the upper supporting element 56a and the carrying element 30a, the guide rod 20a can be used both for coupling and for uncoupling the toothing 50a, 52a between the first coupling part 40a and the second coupling part 42a. In the case of this variant embodiment, a preloading spring for holding the coupling in the closed state is not required, but could additionally be installed. This variant embodiment according to FIG. 6 functions analogously to the variant embodiment of FIG. 5.

It is also conceivable to replace the toothed couplings 38, 38a of FIGS. 5 and 6 by friction couplings, since the latter afford the advantage of a stepless pivoting of the extension arm about its axis. In the case of this variant embodiment, the first coupling part is in engagement with the second coupling part via friction surfaces. The friction surfaces can be designed in this case as coupling disks or coupling cones.

FIGS. 7 and 8 show, in a horizontal and vertical section, a preferred embodiment of the retaining device 24 as is used in the case of the first exemplary embodiment. The retaining device contains a retaining lug 76 which is connected pivotably to the handle 22 via a joint 74, with the articulated connection between handle 22 and retaining lug 76 being formed by a joint bolt 78. The retaining lug 76 is arranged in a recess 80 of the handle 22. The retaining lug 76 is formed from two resilient lug parts 82, 84 which are arranged at a distance from each other. Arranged on the outer sides of the lug parts 82, 84 are latching grooves 86, 88 which, in the latched state, interact with side parts 90, 92 of a longitudinal slot 94 in the pole 4. In order to prevent an inadvertent unlatching of the mainly resiliently designed lug parts 82, 84, there is a blocking slider 96 which can be pushed into the gap between the lug parts 82, 84. The blocking slider 96 contains a hand hoop 98 with which it can be actuated. When the hand hoop 98 is pulled, the blocking slider 96 moves against a stop 100 formed on the retaining lug 76, whereupon the guide rod 20 can be removed from its latching position.

The pivoting of the retaining lug 76 is restricted by stops 102, 104 of the recess 80. The articulated arrangement of the retaining lug 76 on the handle 22 is necessary, so that, during the movement of the slide 8 in the retained state or during the retention itself, the retaining lug 76 can compensate for changing angular positions of the handle 22 and can therefore be aligned with respect to the longitudinal slot 94 of the pole 4 for all positions of the handle 22.

FIG. 9 shows a modified retaining device 24 which has a retaining element designed as a retaining clip 106, which is fastened to the handle 22 and, in the retained state, at least partially engages around the pole 4.

LIST OF DESIGNATIONS

2 Base
4 Pole
6 Extension arm
6a Extension arm
8 Slide
10 Joint
12 Connecting rod
14 Joint
16 Joint
18 Axis
20 Guide rod
20a Guide rod
22 Handle
24 Retaining device
26 Canopy
28 Crank
30 Carrying element
30a Carrying element
32 Sliding sleeve
34 Connecting piece
34a Connecting piece
38 Coupling
38a Coupling
40 First coupling part
40a First coupling part
42 Second coupling part
42a Second coupling part
44 Coupling sleeve
44a Coupling sleeve
46 Fork part
48 Bearing bolt
50 Toothing
50a Toothing
52 Toothing
52a Toothing
54 Preloading spring
56 Supporting element
56a Supporting element
58 Sliding ring
60 First skirt
62 Second skirt
64 Joint
66 Counterpart
68 Ball head
70 Groove
72 Access slot
74 Joint
76 Retaining lug
78 Joint bolt
80 Recess
82 Lug part
84 Lug part
86 Latching groove
88 Latching groove
90 Side part
92 Side part
94 Longitudinal slot
96 Blocking slider
98 Hand hoop
100 Stop
102 Lower stop
104 Upper stop
106 Retaining clip

The invention claimed is:

1. An extension arm for a free arm parasol, pivotably arranged about its axis on a carrier, the extension arm being pivotable by means of a guide rod and being retainable in the pivoted position, the guide rod being arranged on a sleeve, which is pivotable about the extension arm and being latchable into different rotational angle positions with the extension arm and being retainable directly or indirectly on the carrier, and wherein a first coupling part, is connected fixedly to the extension arm and interacts with a second coupling part which is formed on the sleeve and is operable in the axial direction, said first coupling part and said second coupling part forming a coupling, the guide rod having a supporting element which interacts with a counterpart arranged on the extension arm, in order to displace the second coupling part in the axial direction by means of the guide rod.

2. The extension arm as claimed in claim 1, characterized in that the guide rod has a fork part and is coupled with said guide rod to the second coupling part via two bearing bolts.

3. The extension arm as claimed in claim 1, characterized in that the coupling is designed as a toothed coupling, said coupling having at least one tooth element in one coupling part and at least two recesses in the opposite coupling part.

4. The extension arm as claimed in claim 1, characterized in that the coupling is configured as a friction coupling.

5. The extension arm as claimed in claim 1, characterized in that the first coupling part is connected directly to the extension arm.

6. The extension arm as claimed in claim 1, characterized in that one of the coupling parts has a sleeve part surrounding the coupling region and/or a spring region.

7. The extension arm as claimed in claim 1, characterized in that the extension arm is arranged in a manner such that it can rotate about its axis on a carrying element, and the carrying element is connected via a joint to a slide which can be moved and retained along the carrier.

8. The extension arm as claimed in claim 1, characterized in that the supporting element is arranged on an upper arm of the guide rod and has a stop lug which is connected in a sliding manner to the counterpart on the extension arm, the second coupling part being preloaded against the first coupling part by means of a preloading spring.

9. The extension arm as claimed in claim 8, characterized in that the supporting element is designed as a two-sided eccentric.

10. The extension arm as claimed in claim 9, characterized in that the preloading spring is arranged in the interior of the second coupling part and is supported at one end on the coupling part and at the other end on the extension arm.

11. The extension arm as claimed in claim 1, characterized in that the supporting element is arranged on an upper arm of the guide rod and is connected via a joint to the counterpart which is arranged in a manner such that it can pivot about the extension-arm axis.

12. The extension arm as claimed in claim 1, characterized in that the guide rod has a retaining device in its lower section and can be retained on the carrier, which is designed as a pole, by means of retaining element.

13. The extension arm as claimed in claim 12, characterized in that the retaining element is designed as a resilient retaining clip.

14. The extension arm as claimed in claim 12, characterized in that the retaining element is connected to the guide rod in an articulated manner.

15. The extension arm as claimed in claim 12, characterized in that the retaining element is designed as a retaining lug which engages in a longitudinal slot arranged on the pole.

16. The extension arm as claimed in claim 15, characterized in that the retaining lug has two lug parts which are arranged at a distance from each other and engage on side parts of the longitudinal slot in a retaining manner.

17. The extension arm as claimed in claim 16, characterized in that the lug parts are resilient.

18. The extension arm as claimed in claim 16, characterized in that the lug parts are secured against becoming unlatched from the longitudinal slot by means of an insertable blocking slider.

19. The extension arm as claimed in claim 1, characterized in that the first coupling part is connected indirectly to the extension arm.

20. The extension arm as claimed in claim 8, characterized in that the supporting element is designed as a one-sided eccentric.

* * * * *